United States Patent [19]

Karlqvist

[11] Patent Number: 5,505,038
[45] Date of Patent: Apr. 9, 1996

[54] APPARATUS FOR TURNING OBJECTS

[75] Inventor: Lars Karlqvist, Lidkoping, Sweden

[73] Assignee: Rekordverken Sweden AB, Kvanum, Sweden

[21] Appl. No.: 313,201

[22] PCT Filed: Apr. 2, 1993

[86] PCT No.: PCT/SE93/00284

§ 371 Date: Sep. 29, 1994

§ 102(e) Date: Sep. 29, 1994

[87] PCT Pub. No.: WO93/19988

PCT Pub. Date: Oct. 14, 1993

[30] Foreign Application Priority Data

Apr. 3, 1992 [SE] Sweden ................................ 9201060

[51] Int. Cl.⁶ .......................... B65B 11/04; B65B 11/56; B65B 27/12
[52] U.S. Cl. .................... 53/211; 53/215; 53/587
[58] Field of Search .............. 53/587, 211, 215, 53/214, 216, 116, 430; 414/757, 754

[56] References Cited

U.S. PATENT DOCUMENTS

| | | | |
|---|---|---|---|
| 621,955 | 3/1899 | Anderson | 53/215 X |
| 1,772,164 | 8/1930 | Taft | 53/215 X |
| 1,875,567 | 6/1932 | Daniels . | |
| 3,262,246 | 7/1966 | Olsen et al. | 53/587 |
| 5,003,751 | 4/1991 | Ishikawa et al. | 53/587 X |
| 5,259,171 | 11/1993 | Hännikäinen | 53/211 X |
| 5,327,706 | 7/1994 | Skole | 53/587 |

FOREIGN PATENT DOCUMENTS

| | | |
|---|---|---|
| 431966 | 3/1984 | Sweden . |
| 433839 | 6/1984 | Sweden . |
| 432976 | 8/1935 | United Kingdom . |
| 2124975 | 2/1984 | United Kingdom . |
| 9113540 | 9/1991 | WIPO . |

Primary Examiner—James F. Coan
Attorney, Agent, or Firm—Dvorak and Traub

[57] ABSTRACT

A device (1) to turn an object (2), said device comprising an object-supporting bight (4), a continuous belt, line, chain or the like. After the bight (3) the two parts of the belt (4) extend into parts (5, 6) each one of which travels past a deflection means (8, 9), such as a roller. On the lower side of said parts they are united by means of a lower belt part (7). The belt (4) is provided with support members (10–25) support the object, and the length of the belt is sufficient to fully encircle the object (2), or at least partly encircle a symmetrical portion of it, in the intended direction of rotation. In a hypothetical encircling position of the belt, the support members (10–25) extend radially outwards, and these members are configured to essentially fill up the space between the belt itself and the object, and each support member abuts against the object (2) at least at one point. When the object is positioned on said bight (3) and its support members, the belt assumes essentially the same position with respect to the object (2) as when the object was encircled by the belt. In this way, the object will be turned in a controlled manner when the belt is set in motion through turning the deflection means (8).

8 Claims, 3 Drawing Sheets

APPARATUS FOR TURNING OBJECTS

TECHNICAL FIELD

The subject invention concerns an apparatus adapted to rotatably support at least one object.

BACKGROUND OF THE INVENTION

When wrapping objects in paper or plastics it is as a rule necessary to either lift or somehow turn the object on a working table top. This operation is an easy one only if the object has a cylindrical or almost cylindrical shape. On the other hand, if the object is more irregular or angular in shape it becomes a great deal more complicated to wrap the object. For instance, in order to apply a wrapping around a hearty box or a box-shaped bale of straw, the box or bale must first be lifted and placed in position on the wrapping sheet by means of a lifting aid whereupon the wrapping sheet is wound around the object to allow the package to be closed. An alternative way of applying the wrapping is to roll the object to which one end of the wrapping material has been attached, on the table top in such a manner that the wrapping covers the object. The wrapping is then closed about the object. However, rolling of the often angular or square object on the support is a hard and often laborious task, particularly if it is done manually. One solution to mechanize the wrapping procedure is to clamp the object in position at its short ends and to thereafter rotate the object so as to apply the wrapping about it. The object must then be deposited on a working top to allow closing at the short ends. This procedure is a time-consuming one.

PURPOSE OF THE INVENTION

The purpose of the subject invention is to considerably reduce the problems outlined above by creating a device designed to turn an object without fastening it. During its turning movement, the object is supported on a support face which runs round the object while the latter is being turned. In this manner, the entire surface of the object is accessible during the turning movement of the object and as a result the wrapping of the paper or plastics material about the object may be done during the very turning movement. In addition, all the various surfaces of the object become accessible during the turning movement so that text or other information may be applied thereon by means of stamping or otherwise.

SUMMARY OF THE INVENTION

The purpose outlined above is achieved in accordance with the invention in a device possessing the characteristics defined in the appended claims.

The device in accordance with the invention thus is essentially characterised in that the object is placed on a bight of a belt. The belt is provided with a number of support members and the object rests on said members and in some cases also on the belt. The belt travels around at least two deflection means and the support members are mounted on the outer face of the belt. The deflection means could be e.g. rollers or rolls. The length of the belt is sufficient to ensure that it encloses the object in the shape of a circle or, in the case of symmetrical bodies, that part of it encloses the object, in the intended direction of rotation. For, if the object is symmetrical in the direction of rotation, it suffices that the belt encloses a symmetrical part of the object. When this is the case, one or more sides, of an object having a square transectional configuration could in principle be enclosed by the belt. For a stable support of the object a one quarter enclosure of the object is not, however, sufficient. The support members are given a suitable shape by being configured in conformity with the object while the belt is positioned so as to encircle the object with the support members projecting radially inwards, so that at least one point on each and every support member abuts against the object. Instead of a belt, another circular body having the same radius may be used to effect the matching configuration of the support members. From a hypothetical position wherein a belt provided with support members encloses the object like a circle, the members then are positioned on the deflection means of the device and the belt is opened and is carried around the deflection means and is closed on the lower side. The bight of the belt which then supports the object, will adopt the shape of the circular arc corresponding to the circle formed by the belt as it encloses the object like a circle. When one of the deflection means, or both, are driven, the belt will be rotated. Its bight will constantly adopt a circular-arc shape and support the object. This is a consequence of adaptation of the size and the mutual distances between the deflection means to the length of the belt in such a manner that one always obtains a bight having the shape of the desired configuration of a radius of a circle. As a result, the object will be turned and be rotated around the center position of the belt in the circularly enclosing position that was used to tailor the configuration of the support means. This means that the object will be turned in a controlled manner with its center of rotation remaining essentially stable during the turning movement. Thus, even and controlled turning movement of the object will be achieved.

If the device is used to apply a paper or plastics wrapping to the object, this operation preferably is performed by attaching the front edge of the wrapping material, which preferably is stored on a roller, to the object, whereby the wrapping material will accompany the object as the latter is being turned. The wrap is clamped between the object and the support means of the device. For the duration of the turning movement for which the operator suitably selects the number of turns to be performed, the short ends of the object are unobstructed. This means that the operator can start inserting the wrapping material at the short ends of the object while the latter is still being turned. This saves time compared to devices engaging the short end walls of the object during the turning movement. Since the short end walls are unobstructed they may be provided with information or signs as the object is following its path of movement.

In accordance with another alternative manner of wrapping an object in a paper or plastics material, the roller holding the paper or plastics material is carried around the body in one plane, while at the same time, the body is rotating in another plane. In this manner, the entire body is covered in one operation. In accordance with one practical example relating to the wrapping of a square bale of straw in a plastics material, the bale is thus enclosed in six layers of a thin plastics film to produce an airtight package. Because the body is turned at an even speed, an even and overlapping of the layers is obtained. In accordance with one prior-art solution the body rotates on a bight of a conventional conveyor belt. On accont of its angular shape, the body in this case rotates at highly varying speeds and actually it bounces rather than rotates. Consequently, larger widths of the roll of wrapping paper or plastics are required, in addition to which the risks for deficient wrapping are increased. Fragile bodies could hardly be wrapped at all by this method. In order to increase the wrapping speed, two or more rolls could be used when practising the last-mentioned alternative, both rolls being carried in common around the body in the same plane. In accordance with the invention, the object is turned at an even speed about an essentially fixed center of rotation. Obviously, this is particularly important when the wrapping has to be carried out rapidly. The subject invention thus makes it possible to wrap objects more efficiently and with better results, and also to wrap fragile bodies in the manner suggested.

The configuration of the support members and their attachment to the belt do not interfere with the movement of the belt around the deflection means. This means that in many cases they must be hingedly connected to the belt, and a certain clearance must always exist between the side of each support member facing the belt, and the belt itself as the latter travels around the deflection means. This feature will be explained in closer detail in connection with the description of the various preferred embodiments. As already mentioned, the belt of the device may circularly enclose for instance three quarters or half of the body circumference when the body is symmetrical. In this case the object will rotate over three quarters or over half a turn for each rotational turn of the belt. The belt of the device could also consist of a number of composite circularly enclosing belt sections. In this case the object will rotate over two, three or several turns when the composite belt completes one full rotational turn. For instance, when the belt of the device encircles a symmetrical body over two and three quarters of a turn, the body will rotate over two and three quarters of a turn upon each full rotational turn of the belt. Solutions of the kind outlined in the aforegoing provide more freedom of design of the various parameters that affect the manner in which the object is turned. This may be of importance, particularly in the case of objects having a rather complex configuration.

BRIEF DESCRIPTION OF THE DRAWINGS

All embodiments of the invention will be described in closer detail with reference to the accompanying drawings wherein identical reference numerals have been used in the various drawing figures to designate corresponding details and wherein.

DESCRIPTION OF PREFERRED EMBODIMENTS

Figure 1:
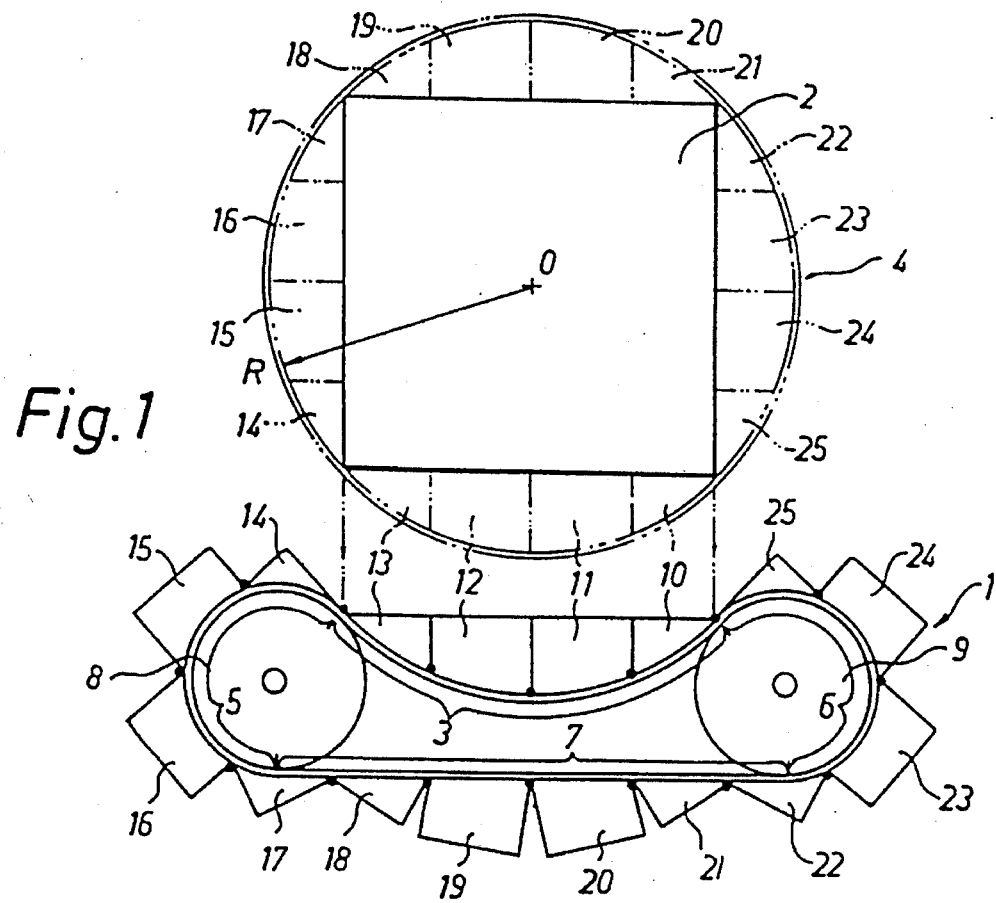
FIG. 1 is a side view of the present invention, the object to be rotated, and the adaptation of the support members of the device.

In FIG. 1, numeral reference 1 designates a device arranged to turn or rotate an object 2. The device comprises a belt, line, chain or the like 4 which is endless during the turning movement. The belt is flexible and is looped or wrapped around at least two deflection means 8, 9, such as rollers, wheels or rolls. A larger number of rolls could be used, should this be deemed suitable. The length of the belt 4 is adapted to ensure that a bight 3 is formed on the upper face of the device 1. The object 2 is supported on this bight of the belt by resting on a plurality of support members 10–25 which are secured to the belt.

By a suitably choosing of the length of the belt, the shape and the size of the support members, and the distance between the deflection means 8, 9, a device is created which turns or rotates the objects in a controlled manner. The principles guiding the choice of the parameters are understood from viewing FIG. 1. The upper part of the drawing figure shows the manner in which the belt 4 encircles the object 2 in an imaginary position, illustrated in dash-and-dot lines in the figure. Consequently, the belt must be sufficiently long to enclose the object or a symmetrical part thereof within a circle. The center of the circle is designated by 0 and the radius by the designation R. In accordance with the shown embodiment the object 2 is square and its corners lie directly on the belt. With the same angular enclosure of the object the belt could also have been longer. In that case, the corners of the object would not have touched the belt directly. The space between the belt 4 and the object 2 is filled up with a number of support members 10–25. The upper part of FIG. 1 thus shows the manner in which it is possible to devise a suitable configuration of the support members 10–25 on the basis of a given length of the belt 4. The support members are to be shaped in conformity with the imagined circular shape of the belt as well as with the shape of the object 2. In accordance with the embodiment shown the support members fill up the entire space closest to the object 2. Thus, the faces of the support members that extend towards the object will be able to support one another, which is an advantage. However, this is not necessary but their surface of contact with the object 2 could equally well be smaller, in many cases even just in the form of a point. Since the object usually has a considerable longitudinal extent it therefore would be supported by a number of lengthwise cam members, tubes, stays or the like.

When a large number of objects of identical configuration or almost identical configuration, such as e.g. standard bales of straw, are to be turned or rotated, the time required to produce the required support members 10–25 and to mount them on the belt 4, is not of great importance. On the other hand, when a small number of objects of identical configuration are to be rotated, considerably speedier methods are required to produce and mount the support members. This could be done by initially providing the belt with support members having a variable geometry. The belt is initially positioned in its encircling position and held there while the support members are moved inwards, either manually or automatically, into contact with the object. Finally, they are secured manually or automatically, and whereupon the belt and the object is mounted on the deflection means 8, 9 of the device 1. The belt 4 is then opened up at a suitable location therein, is looped around the deflection means and is then re-closed.

In practical terms, the variable geometry could be achieved by making the stays or stay plates adjustable as to their length, and by interconnecting them hingedly at their ends, either to one another, or by way of intermediate stays or stay plates. This solution makes it possible to quickly form the support members illustrated in FIGS. 1–4. The support members could also be in the shape of blocks equipped with a number of contact means arranged to be extended into contact with the object which can then be immobilized in that extended position. In both cases the adjustment may be effected by telescopic or excentric attachment means.

The basic principle of the device 1 shown in FIG. 1 is that the object rests on a bight 3 of the belt. The bight is in the shape of an arc of a circle, which means that the belt and the support members assume the same position with respect to the object as they do in the imaginary upper position wherein the belt encircles the object 2. The transition from the encircling position of the belt, to the operative position of the belt, when mounted in the device, is most easily understood by imagining that the object together with the encircling belt, is lowered vertically downwards along the indicated dash-and-dot lines in such a manner that the bight 3 together with its support members 10–13 is supported in the shown circular-arc position. The position of the object 2 now is identical to the one the object assumes in the upper part of the drawing figure. If we now imagine that the belt in the upper part of the figure is divisible, for instance between support members 19 and 20, the belt may be opened up and the two belt ends be wound around the two deflection means 8 and 9, respectively. One belt part will be in contact with the deflection means 8 along the stretch indicated by 5 whereas the other belt part will be in contact with the deflection means 9 along the stretch indicated by 6. The two belt parts thereafter follow a horizontal stretch 7 where they meet. If the distance between the deflection means 8, 9 and the size of these means are adjusted correctly, the belt ends will just reach one another. In the embodiment illustrated, the object 2 will be rotated one full turn counter-clockwise when the belt 4 performs one complete turn in the clockwise direction. This means that the angular enclosure of the belt bight 3 around the object is comparatively small, about 90° of the circumference of the object. In addition, the diameter of the deflection means 8, 9 is comparatively limited. However, it is also possible to design the device 1 in such a manner that the object 2 will be rotated two, three, four or more turns for each complete rotational turn of the belt 4. This could be effected by using two or nmore several belts, each equipped with support members 10–25, which can be interconnected into one long belt which travels around the device 1. The angular enclosure of the belt bight part 3 could then be considerably larger and the diameters of the deflection means 8, 9 be larger or else a larger number of deflection means could be used. This option is of importance when more fragile objects 2 are to be handled by the rotating device or when even and controlled turning motions are critical. This is the case when it is desirable that the center of rotation C of the object remains very stable during the turning movement, or whenever precision is of primary importance in these respects. When the body is symmetrical, parts of an encircling turn could be used, for instance only two of the four sides.

Figure 2:
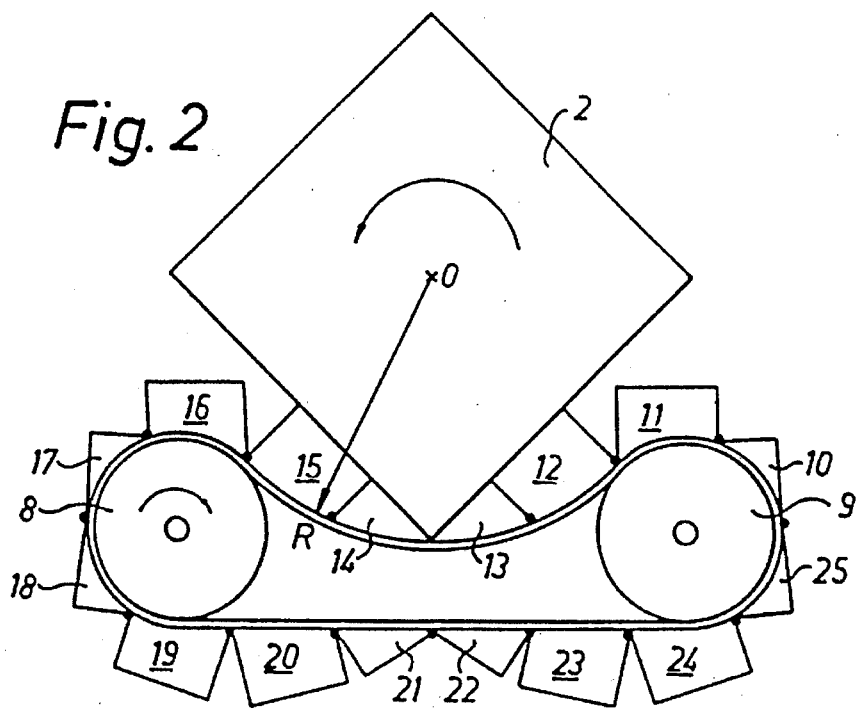
FIG. 2 illustrates the position of the object after it has been turned as a result of movement of the belt over a certain distance.
Figure 3:
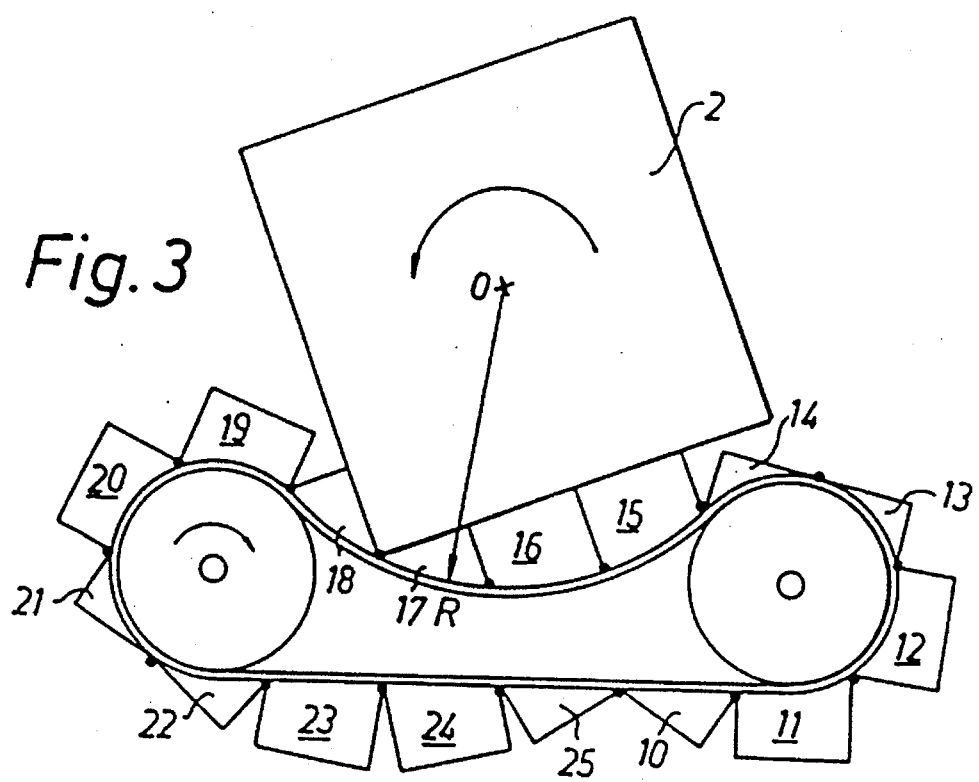
FIG. 3 illustrates the position of the object after additional turning thereof by means of the device.
Figure 4:
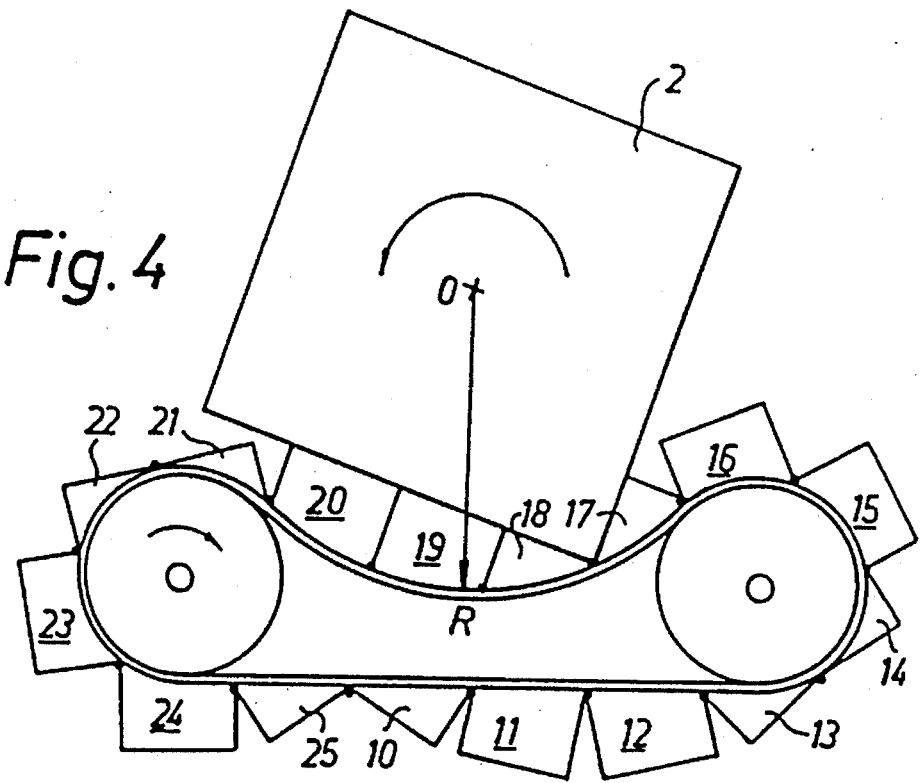
FIG. 4 illustrates the position of the object following further turning movement.

In order to understand this line of reasoning, the manner of support of the object 2 in accordance with FIGS. 1–4 should be studied. Each support member 10–25 is attached to the belt at two points in the lengthwise extension of the belt. Preferably, the support members 10–25 are hingedly secured to the belt in these two points In addition, the support members should be designed to ensure that no part thereof will be squeezed against the belt as the latter travels past any of the deflection means 8, 9. The support members could consist for instance of bent sheet metal plates, tubes or stays having two sides facing outwards from the belt, such as for instance the support members 25, 10, 13, 14, 17, 18, 21, 22, or have three sides facing outwards from the belt, as is the case with the remaining support members. The support members that are positioned on the bight 3, which is shaped as an arc of a circle, are those that support the object 2. They assume the same position with respect to the object 2 that they had in the encircling position of the belt 4. The support members having one pivot point positioned on the belt bight and the second pivot point positioned on the respective deflection means 8, or 9 assume a position deviating from in the encircling position of the belt 4. In FIG. 1, the support member 14 is just about to move into engagement with the object 2 and the support member 25 is about to move away from its engagement with the object 2. In FIG. 2, the support member 16 is about to move into an engagement position and in FIG. 3, the support member 19 is too, and in FIG. 4, the support member 21 is about to do so. In FIG. 2 the support member 11 has left its position of object engagement as have support member 14 in FIG. 3 and support member 16 in FIG. 4. It is important that the support members move into and out of their positions of engagement without causing damage to the object that is turned by the device, or to any material that might be in progress of being wrapped about the object. For this reason, the support member corners could be rounded to present cutting or scratching either the object or its wrapping material.

The sequence of the drawing FIGS. 1–4 illustrate the manner in which the object 2 is turned or rotated in consequence of the rotary movement of the belt 4, which could be effected by driving one of the deflection means, e.g. means 8, in a rotary clockwise motion. An important advantage brought about by the device is that the object 2 is imparted an essentially rotary movement about the center of rotation 0 that was chosen when the configuration of the support members was decided. The object shown in the drawing figure sequence 1–4 could be a bale of straw onto which a protective cover of is to be applied. Since the bale has a considerable lengthwise extension it is reasonable to use a belt having approximately the same lengthwise extension. The bale will therefore rest steadily on the belt. Since the bale merely rests on the support members and is given a rotary motion by said members, all faces of the object are accessible during wrapping for marking, which is an important advantage.

Figure 5:
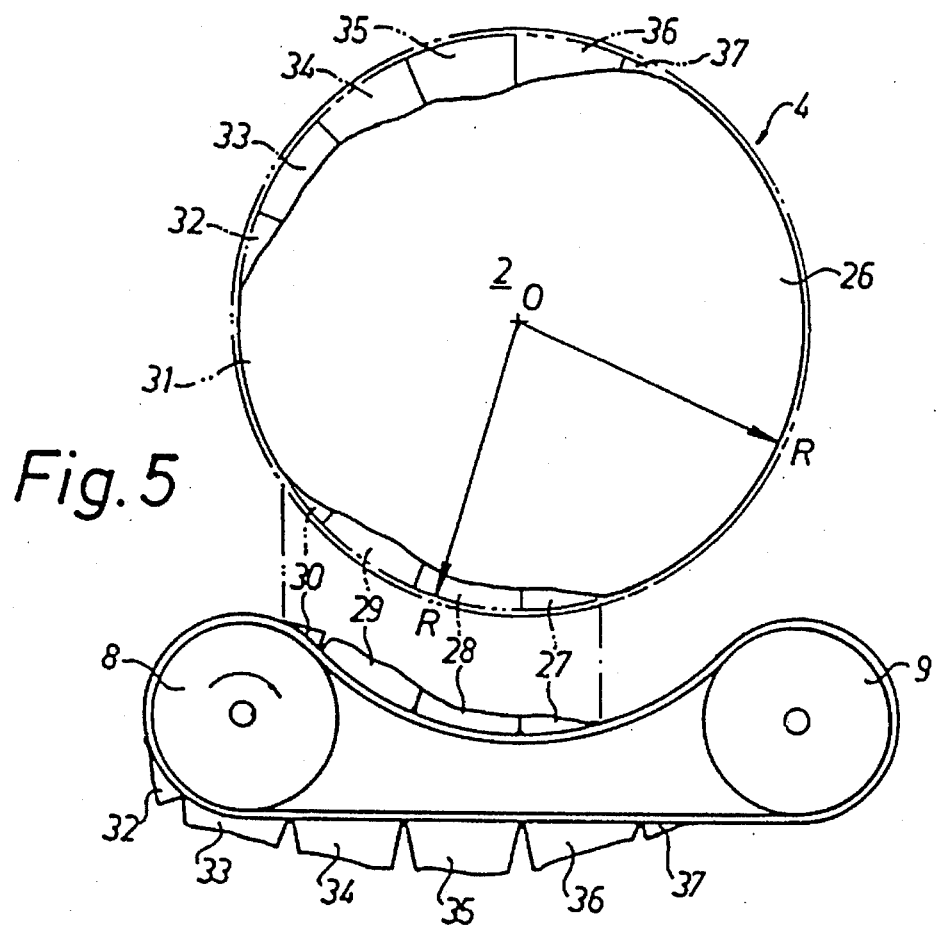
FIG. 5 illustrates the manner in which the support members of the device have been adapted for objects having a rounder configuration. Like in FIG. 1, the object is lowered vertically straight down so as to rest on the belt of the device.
Figure 6:
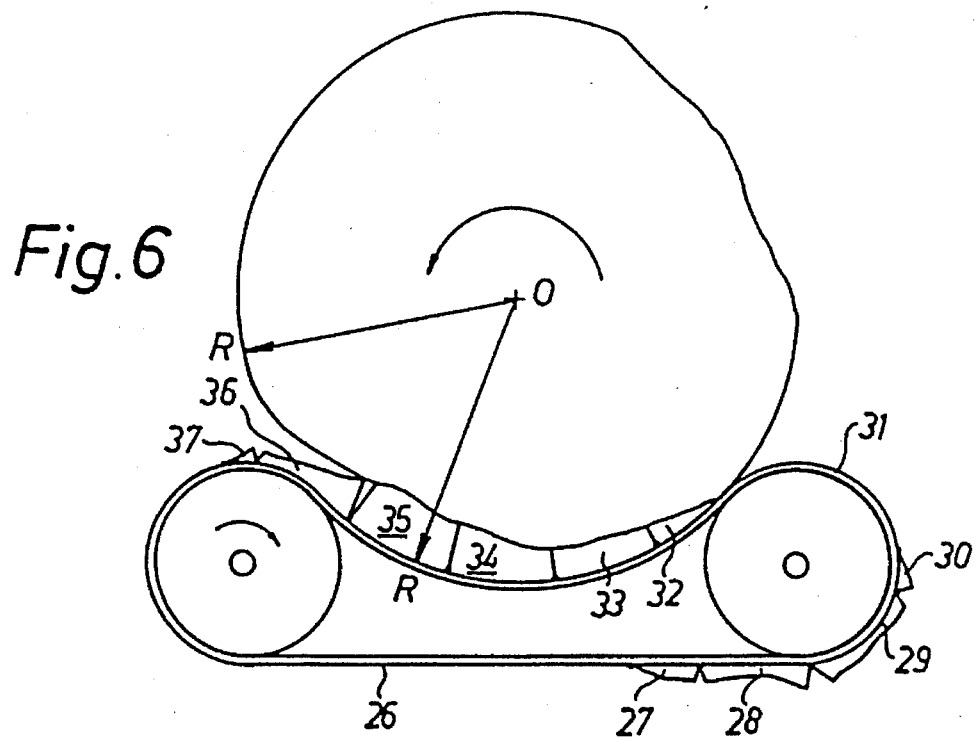
FIG. 6 illustrates the position of the object after the belt has been turned over a certain distance.

FIGS. 5 and 6 show in a similar manner an object 2 having a comparatively round circumferential configuration and resting on the belt 4. Since large stretches of the circumference in this case follow the circular-arc shape, the number of support members may be reduced considerably. The stretches following the arc of the circle are designated in the drawing figures by references 26 and 31. Thus, they need not have any support members, the latter being provided in two groups, 22–30 and 32–37, respectively. In case the object 2 has a small lengthwise extension and therefore cannot rest steadily on a belt, it is conceivable to provide staying means to ensure that the object does not fall over.

In the drawing figures illustrated, each support member is, as already mentioned, hingedly attached to the belt in two points in the lengthwise extension of the belt. Intermediate the attachment points, the belt is free, allowing it to bulge or bend in the opposite direction as it moves past the deflection means 8, 9, such that the belt movements may be undisturbed. However, it is likewise possible to attach the support members to the belt in a different manner. For instance, at one or both ends of the support member the side thereof could be retracted, whereby the hinged attachment would be positioned closer to the middle of the support member. In this manner one or two support faces would be created which then preferably are shaped as a circular arc so as to conform with the belt in the encircling position thereof. In this manner the belt will absorb the weight of the object in a more favourable manner. This is of importance, particularly in the case of heavy objects. In this manner, the ability of the bight 3 to retain the desired circular-arc configuration is improved. In addition, it is possible to provide the support members with one single attachment point positioned adjacent or close to the center of the belt lengthwise. In this manner the entire surface of the support member that is turned against the belt could be configured in conformity with the circular arc of the enclosing circle, which is the optimum configuration to support the weight of the object. On the other hand, the modifications just referred to, provide a less efficient guide and control of the support members as the latter moves in and out of the object-engaging positions.

As appears from FIGS. 5 and 6 the support members have side walls that point towards the imagined center of rotation. In other words, the support members are shaped like sectors of a circle, whereas in the other drawing figures they are more box-shaped. In the circularly enclosing position, the side walls of the support members abut against one another. This means that they will support one another on the bight 3 of the belt and consequently they attribute to maintaining the circular-arc configuration of the bight. The device 1 could also be used for bodies of many various shapes. As already mentioned, a number of factors affect the conditions during the movements of the support members into and out of engagement. By appropriate choice of the belt geometry and support member configuration it is possible to handle bodies of almost any shape. Another important factor is the sensitivity toward objects and the wrapping material, if any.

I claim:

1. An apparatus for rotatably supporting at least one object having an outside surface and a portion thereof which is symmetrical, said object including an axis of rotation, wherein a distance exists between said axis and said outside surface, comprising;

a flexibly arranged and continuously moving conveying means having an outer face, an inner face, a front edge, a trailing edge, a first and a second end, said front and trailing edges defining a width of said conveying means, said first and second ends defining a length of said means, said first and second ends connected together such that said means forms a perpetual loop when said means is operatively moving and rotatively supporting said object;

a plurality of support members attached along said outer face of said conveying means, said members in supporting contact with said object when placed on said conveying means, each of said members having multiple sides, one of said sides attached to said conveying means, and one of said sides in contact with said object, and adjacent support members having adjacent sides;

a first and second means for causing a deflection in said conveying means, said first and second means longitudinally displaced from each other and having parallel rotational axis wherein each of said first and second means rotates in a common direction, each of said first and second means having an outside surface which defines a generally circular configuration, said conveying means wrapped around and in simultaneous contact along a part of a respective outside surface of each said deflection means such that said perpetual loop of said conveying means is in an encircling position, whereby said loop forms a respective stretch portion about each deflection means, a common bight portion therebetween, and a common horizontal stretch portion therebetween, said horizontal stretch portion vertically below said bight portion, said bight portion having a semi-arcuate shape for receiving said object therein, said semi-arcuate shape substantially equal to an imaginary arc segment that said radius of said object would form if said radius was swept about said axis of said object, said imaginary arc segment defining a space between said arc segment and said outside surface of said object, wherein said plurality of support members are configured to mirror said same space between said imaginary arc segment and said outside surface of said object, said space being linearly transposed in the form of said support members along said conveying means.

2. A device as claimed in claim 1, wherein the support members contact each other along their respective adjoining sides when the belt is in said encircling position.

3. A device as claimed in claim 1, wherein said support members are mounted on the top side of said belt at two attachment points, the belt being configured such that the belt may roll around the deflection means without said means interferring with the support members.

4. A device as claimed in claim 3, wherein said attachment points are located on the front and trailing edges of the support member, thereby connecting each said member to the belt.

5. A device as claimed in claim 3, wherein said attachment points are spaced from the front and trailing edge of the associated support member in such a manner that when said belt is in the object-encircling position, said member conforms to the circular shape of the belt.

6. A device as claimed in claim 1, wherein at least one of the support members is mounted on the belt by means of an attachment point, and the side of the support member which faces the belt in the object-encircling position, essentially conforms with the circular shape of the belt such that the belt bight will be evenly loaded by the object.

7. A device as claimed in claim 6, wherein the point of attachment of the support member is halfway between the front and trailing edges of the support member.

8. A device as claimed in claim 1, wherein at least one support member is hingedly attached to the belt so that the attachment does not interfere with the ability of the belt to roll around the deflection means.

* * * * *